US012675898B2

(12) United States Patent
Gregson et al.

(10) Patent No.: US 12,675,898 B2
(45) Date of Patent: Jul. 7, 2026

(54) METHOD AND APPARATUS FOR DETERMINING A POSE OF A VEHICLE, AND VEHICLE CONTAINING SAME

(71) Applicant: HUAWEI TECHNOLOGIES CO., LTD., Shenzhen (CN)

(72) Inventors: James Gregson, Ottawa (CA); Shao Hua Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 474 days.

(21) Appl. No.: 18/082,738

(22) Filed: Dec. 16, 2022

(65) Prior Publication Data

US 2024/0202964 A1    Jun. 20, 2024

(51) Int. Cl.
| | |
|---|---|
| *G06T 7/73* | (2017.01) |
| *G06V 10/82* | (2022.01) |
| *G06V 20/56* | (2022.01) |
| *G06V 20/58* | (2022.01) |
| *G08G 1/16* | (2006.01) |

(52) U.S. Cl.
CPC ............... *G06T 7/73* (2017.01); *G06V 10/82* (2022.01); *G06V 20/58* (2022.01); *G06V 20/588* (2022.01); *G06T 2207/20084* (2013.01); *G06T 2207/30256* (2013.01); *G06T 2207/30261* (2013.01); *G08G 1/16* (2013.01)

(58) Field of Classification Search
CPC ............. G06T 7/73; G06T 2207/20084; G06T 2207/30256; G06T 2207/30261; G06V 20/58; G06V 10/82; G06V 20/588; G08G 1/16
See application file for complete search history.

(56) References Cited

U.S. PATENT DOCUMENTS

| | | | | |
|---|---|---|---|---|
| 2018/0260651 | A1* | 9/2018 | Wang ..................... | G06V 10/82 |
| 2021/0397857 | A1* | 12/2021 | Liu ........................ | G06V 20/58 |

OTHER PUBLICATIONS

Ahmed Ali, Ali Hassan, Afsheen Rafaqat Ali, Hussam Ullah Khan, Wajahat Kazmi, Aamer Zaheer; Real-time vehicle distance estimation using single view geometry, Proceedings of the IEEE/CVF Winter Conference on Applications of Computer Vision (WACV), 2020.

Kendall, Alex, Matthew Grimes, and Roberto Cipolla. Posenet: A convolutional network for real-time 6-dof camera relocalization., Proceedings of the IEEE international conference on computer vision. 2015.

Salaün, Yohann, Renaud Marlet, and Pascal Monasse. "Robust and accurate line-and/or point-based pose estimation without manhattan assumptions." European Conference on Computer Vision. Springer, Cham, 2016.

(Continued)

*Primary Examiner* — Matthew C Bella

*Assistant Examiner* — Jinsu Hwang

(74) *Attorney, Agent, or Firm* — Tim Tingkang Xia, Esq.; Troutman Pepper Locke LLP

(57) ABSTRACT

A set of unordered points associated with road markings is received. The unordered points are inputted to a trained artificial neural network. Using the artificial neural network, an output is generated by applying non-linear regression to the unordered points. Based on the output, a pose of a vehicle is determined.

19 Claims, 10 Drawing Sheets

(56) References Cited

OTHER PUBLICATIONS

Mur-Artal, Raul, Jose Maria Martinez Montiel, and Juan D. Tardos. "ORB-SLAM: a versatile and accurate monocular SLAM system." IEEE transactions on robotics 31.5 (2015): 1147-1163.

Lategahn, Henning, Andreas Geiger, and Bernd Kitt. "Visual SLAM for autonomous ground vehicles." 2011 IEEE International Conference on Robotics and Automation. IEEE, 2011.

Elqursh, Ali, and Ahmed Elgammal. "Line-based relative pose estimation." CVPR 2011. IEEE, 2011.

Kluger, Florian, et al. "Temporally consistent horizon lines." 2020 IEEE International Conference on Robotics and Automation (ICRA). IEEE, 2020.

Li, Fei, Da-quan Tang, and Ning Shen. "Vision-based pose estimation of UAV from line correspondences." Procedia Engineering 15 (2011): 578-584.

Shavit, Yoli, and Ron Ferens. "Introduction to camera pose estimation with deep learning." arXiv preprint arXiv:1907.05272 (2019).

Qi, Charles R., et al. "Pointnet: Deep learning on point sets for 3d classification and segmentation." Proceedings of the IEEE conference on computer vision and pattern recognition. 2017.

* cited by examiner

120

METHOD AND APPARATUS FOR DETERMINING A POSE OF A VEHICLE, AND VEHICLE CONTAINING SAME

FIELD

The present disclosure relates to autonomous vehicles and in particular to methods and systems for determining a pose of a vehicle.

BACKGROUND

In the quest for fully-autonomous driving, vehicles are being incorporated with more automatic features to assist drivers or to fully replace the need for interaction. Forward Collision Warning (FCW) is one such autonomous feature that can warn drivers of potential upcoming collisions with slowed or stopped traffic in the vehicle path. FCW systems may also interact with Automatic Emergency Braking (AEB) systems in the event that a collision would be unavoidable without immediate intervention. FCW systems must be able to identify obstacles in the vehicle path, determine range or Time-To-Collision (TTC) predictions, and trigger warnings and/or perform other actions when these fall outside nominal ranges.

However, TTC and range estimates can vary significantly depending on the orientation (in particular, the pitch) of the ego-vehicle (the vehicle making computations about itself) with respect to the road surface. Furthermore, this factor can vary rapidly with driving behavior such as acceleration/braking as well as road surface characteristics such as bumps or potholes.

Current systems that attempt to determine vehicle pose include classical computer vision approaches for regressing the vehicle pose from features such as vanishing points, sets of parallel lines, or sets of mutually orthogonal lines that are detected in the single input image. These solutions may only be accurate (or possible to compute) when the underlying mathematical assumptions are strictly observed in the detected features. In other words, the techniques break down when curving lane lines, instead or parallel lines, are considered.

Other methods use deep learning to estimate vehicle pose, taking a single image as input. Still other methods, such as Visual Odometry (VO) or Simultaneous Localization & Mapping (SLAM) systems, construct a map of their environment and localize the vehicle pose within it. All such methods are computationally expensive.

SUMMARY

According to a first aspect of the disclosure, there is provided a method of determining a pose of a vehicle, comprising: receiving a set of unordered points associated with road markings; inputting the unordered points to a trained artificial neural network; using the artificial neural network to generate an output by applying non-linear regression to the unordered points; and determining, based on the output, the pose of the vehicle. As a result, the computational burden associated with determining the pose of the vehicle may be reduced.

Receiving the set of unordered points may comprise receiving the set of unordered points from a lane detection computer module configured to identify, within one or more images of the road markings, the unordered points. The unordered points may therefore be obtained from a The lane detection computer module may be configured to identify the unordered points using one or more convolutional neural networks.

Before inputting the unordered points to the artificial neural network, the set of unordered points may be determined to be valid.

Determining that the set of unordered points is valid may comprise determining that one or more of: the unordered points are associated with at least two sets of lane markings, each set of lane markings comprising one or more aligned lane markings; and at least a preset number of the unordered points are associated with a given set of lane markings, each set of lane markings comprising one or more aligned lane markings.

The method may further comprise, before inputting the unordered points to the artificial neural network, normalizing the set of unordered points based on a camera intrinsic matrix associated with a camera onboard the vehicle.

The method may further comprise, before inputting the unordered points to the artificial neural network, augmenting the set of unordered points by increasing a dimensionality of each unordered point by at least one.

Augmenting the set of unordered points may comprise associating one or more of the following with each unordered point: a direction associated with the unordered point and at least one other unordered point; a group comprising the unordered point and at least one other unordered point; and a line fitted to the unordered point and at least one other unordered point.

The method may further comprise, before inputting the unordered points to the artificial neural network, one or more of: increasing the number of unordered points by randomly sampling with replacement at least some of the unordered points; in response to determining that the number of unordered points is above a threshold, reducing the number of unordered points by randomly sampling at least some of the unordered points; in response to determining that the number of unordered points is above a threshold, reducing the number of unordered points by filtering out one or more unordered points that are neither within a minimum preset distance nor a maximum preset distance from the vehicle; and for each unordered point, filtering out of the unordered point if it is determined to not relate to a road marking.

Generating the output by applying non-linear regression to the set of unordered points may comprise: passing each unordered point through a first multi-layer perceptron neural network to generate an updated unordered point comprising an R-dimensional feature; passing each updated unordered point through a second multi-layer perceptron neural network to generate an S-dimensional feature, wherein S>R; generating an S-dimensional global feature by applying an order-independent reduction operation to each S-dimensional feature; and generating the output by passing the S-dimensional global feature through a third multi-layer perceptron neural network.

Determining the pose of the vehicle may comprise: adjusting the output based on an orientation of a camera onboard the vehicle; and determining the pose based on the adjusted output.

The method may further comprise: providing the determined pose to a collision warning system configured to identify, in one or more images, one or more objects and their respective one or more positions relative to the vehicle; and using the collision warning system to adjust, based on the determined pose, the position of at least one identified object. The accuracy of the collision warning system may therefore be improved.

The pose of the vehicle may comprise a pitch of the vehicle.

According to a further aspect of the disclosure, there is provided a vehicle comprising: a vehicle pose module comprising one or more processors communicative with one or more computer-readable media and configured to: receive a set of unordered points associated with road markings; input the unordered points to a trained artificial neural network; use the artificial neural network to generate an output by applying non-linear regression to the unordered points; and determine, based on the output, a pose of the vehicle.

According to a further aspect of the disclosure, there is provided a non-transitory computer-readable medium comprising computer program code configured, when executed by one or more processors, to cause the one or more processors to perform a method comprising: receiving a set of unordered points associated with road markings; inputting the unordered points to a trained artificial neural network; using the artificial neural network to generate an output by applying non-linear regression to the unordered points; and determining, based on the output, a pose of the vehicle.

This summary does not necessarily describe the entire scope of all aspects. Other aspects, features and advantages will be apparent to those of ordinary skill in the art upon review of the following description of specific embodiments.

4

Figure 11:
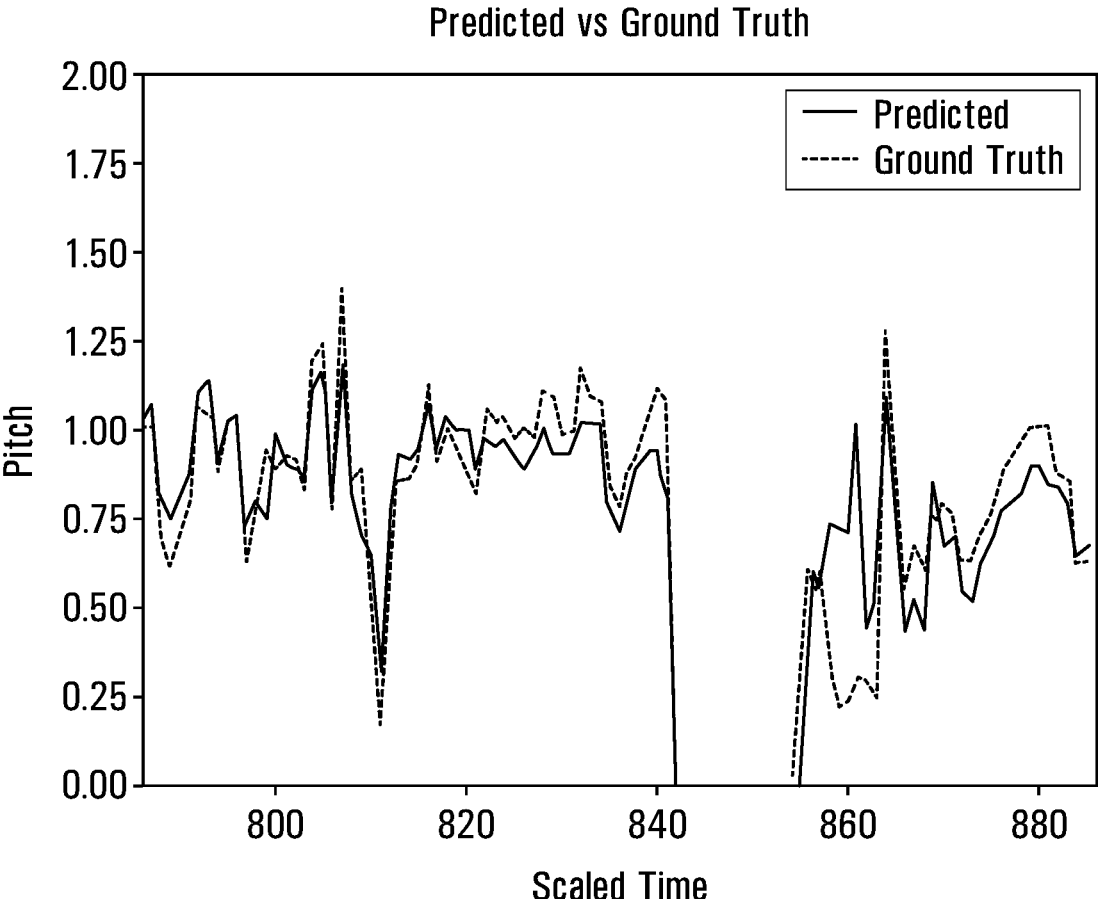

FIG. 11 shows a comparison of measured vehicle pose to predicted vehicle pose using a method according to an embodiment of the disclosure.

DETAILED DESCRIPTION

The present disclosure seeks to provide methods and systems for determining a pose of a vehicle (or simply "vehicle pose"). While various embodiments of the disclosure are described below, the disclosure is not limited to these embodiments, and variations of these embodiments may well fall within the scope of the disclosure which is to be limited only by the appended claims.

Generally, according to embodiments of the disclosure, there is described a method of determining vehicle pose that is generally less computationally expensive than methods used in the prior art, and that is able to determine vehicle pose from a single input image. In particular, the vehicle pose can be regressed from one or more roadway markings using a single image from a single camera. For example, unordered sets of discrete roadway markings that have detected by an Advanced Driver-Assistance System (ADAS) onboard the vehicle may be provided to a machine-learning model to improve robustness, relax assumptions, and decrease the computational burden relative to other approaches in the prior art. As will be described in further detail below, a custom neural network architecture may be used to perform the regression. The estimates of vehicle pose can then be used to correct the predictions of other systems, such as Closest In-Path Vehicle (CIPV) detections.

System Structure

As will be described later in more detail, a "module" is a term of explanation referring to a hardware structure such as circuitry implemented using technologies such as electrical and/or optical technologies (including, but not limited to, the use of semiconductors) for performing defined operations or processing. A "module" may alternatively refer to the combination of a hardware structure and a software structure, wherein the hardware structure may be implemented using technologies such as electrical and/or optical technologies (including, but not limited to, the use of semiconductors) in a general manner for performing defined operations or processing according to the software structure in the form of a set of instructions stored in one or more non-transitory, computer-readable storage devices or media.

As will be described in more detail below, the pose determination module may be a part of a device, an apparatus, a system, and/or the like, wherein the pose determination module may be coupled to or integrated with other parts of the device, apparatus, or system such that the combination thereof forms the device, apparatus, or system.

The pose determination module executes a process for determining vehicle pose. Herein, a process has a general meaning equivalent to that of a method, and does not necessarily correspond to the concept of a computing process (which is the instance of a computer program being executed). More specifically, a process herein is a defined method implemented using hardware components for processing data (for example, image data and/or the like). A process may comprise or use one or more functions for processing data as required. Herein, a function is a defined sub-process or sub-method for computing, calculating, or otherwise processing input data in a defined manner and generating or otherwise producing output data.

As those skilled in the art will appreciate, the pose determination process disclosed herein may be implemented using one or more software and/or firmware programs having necessary computer-executable code or instructions and stored in one or more non-transitory, computer-readable storage devices or media which may be any volatile and/or non-volatile, non-removable, or removable storage devices such as RAM, ROM, EEPROM, solid-state memory devices, hard disks, CDs, DVDs, flash memory devices, and/or the like. The pose determination module may read the computer-executable code from the storage devices and execute the computer-executable code to perform the pose determination process.

Alternatively, the pose determination process disclosed herein may be implemented using one or more hardware structures having necessary electrical and/or optical components, circuits, logic gates, integrated circuit (IC) chips, and/or the like.

Figure 1:
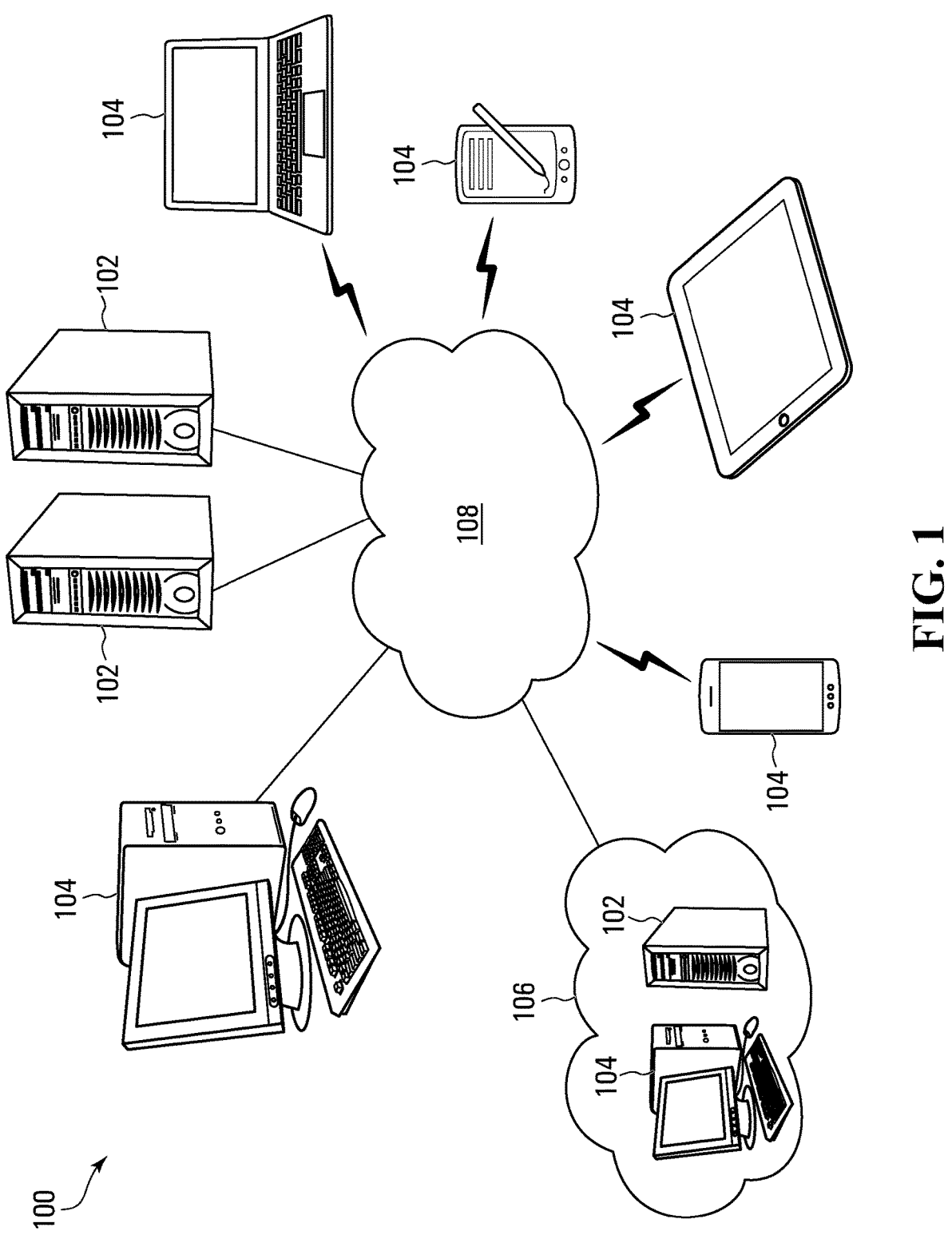
FIG. 1 is a schematic diagram of a computer network system for determining a pose of a vehicle, according to an embodiment of the disclosure.

Turning now to FIG. 1, a computer network system for determining vehicle pose is shown and is generally identified using reference numeral 100. As shown in FIG. 1, the pose determination system 100 comprises one or more server computers 102, a plurality of client computing devices 104, and one or more client computer systems 106 functionally interconnected by a network 108, such as the Internet, a local area network (LAN), a wide area network (WAN), a metropolitan area network (MAN), and/or the like, via suitable wired and wireless networking connections.

Server computers 102 may be computing devices designed specifically for use as a server, and/or general-purpose computing devices acting as server computers while also being used by various users. Each server computer 102 may execute one or more server programs.

Client computing devices 104 may be portable and/or non-portable computing devices such as laptop computers, tablets, smartphones, Personal Digital Assistants (PDAs), desktop computers, and/or the like. Each client computing device 104 may execute one or more client application programs which sometimes may be called "apps".

Figure 2:
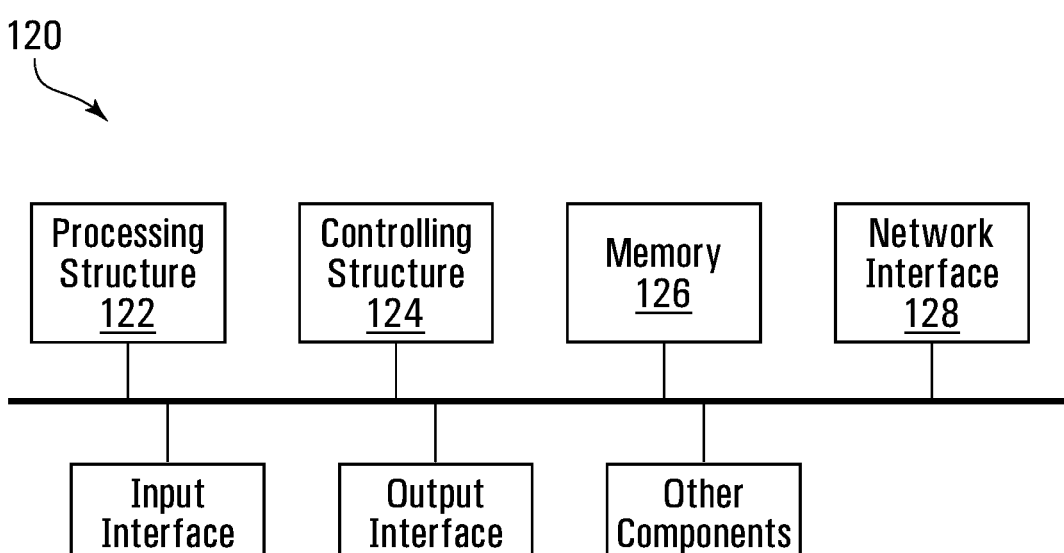
FIG. 2 is a schematic diagram of a simplified hardware structure of a computing device of the computer network system shown in FIG. 1.

Generally, computing devices 102 and 104 comprise similar hardware structures such as hardware structure 120 shown in FIG. 2. As shown, hardware structure 120 comprises a processing structure 122, a controlling structure 124, one or more non-transitory, computer-readable memory or storage devices 126, a network interface 128, an input interface 130, and an output interface 132, functionally interconnected by a system bus 138. Hardware structure 120 may also comprise other components 134 coupled to system bus 138.

Processing structure 122 may be one or more single-core or multiple-core computing processors, generally referred to as central processing units (CPUs), such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like. When processing structure 122 comprises a plurality of processors, the processors thereof may collaborate via a specialized circuit such as a specialized bus or via system bus 138.

Processing structure 122 may also comprise one or more real-time processors, programmable logic controllers (PLCs), microcontroller units (MCUs), μ-controllers (UCs), specialized/customized processors, hardware accelerators, and/or controlling circuits (also denoted "controllers") using, for example, field-programmable gate array (FPGA)

or application-specific integrated circuit (ASIC) technologies, and/or the like. In some embodiments, processing structure 122 includes a CPU (otherwise referred to as a host processor) and a specialized hardware accelerator which includes circuitry configured to perform computations of neural networks such as tensor multiplication, matrix multiplication, and the like. The host processor may offload some computations to the hardware accelerator to perform the operations of a neural network. Examples of a hardware accelerator include a graphics processing unit (GPU), Neural Processing Unit (NPU), and Tensor Process Unit (TPU). In some embodiments, the host processors and the hardware accelerators (such as the GPUs, NPUs, and/or TPUs) may be generally considered to be processors.

Generally, processing structure 122 comprises necessary circuitries implemented using technologies such as electrical and/or optical hardware components for executing a vehicle pose determination, using data received from input 106 and outputting the resulting vehicle pose through output 108.

For example, processing structure 122 may comprise logic gates implemented by semiconductors to perform various computations, calculations, and/or processing. Examples of logic gates include AND gates, OR gates, XOR (exclusive OR) gates, and NOT gates, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and outputs the inverted input as the output.

While the inputs and outputs of the logic gates are generally physical signals and the logic or processing thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named), "calculating", or more generally "processing", for generating or producing the outputs from the inputs thereof.

Sophisticated combinations of logic gates in the form of a circuitry of logic gates, such as processing structure 122, may be formed using a plurality of AND, OR, XOR, and/or NOT gates. Such combinations of logic gates may be implemented using individual semiconductors, or more often may be implemented as integrated circuits (ICs).

A circuitry of logic gates may be "hard-wired" circuitry which, once designed, may only perform the desired functions. In this example, the processes and functions thereof are "hard-coded" in the circuitry.

With the advance of technology, it is often the case that a circuitry of logic gates such as processing structure 122 may be alternatively designed in a general manner so that it may perform various processes and functions according to a set of "programmed" instructions implemented as firmware and/or software and stored in one or more non-transitory, computer-readable storage devices or media. In this example, the circuitry of logic gates such as processing structure 122 is usually of no use without meaningful firmware and/or software.

Of course, those skilled the art will appreciate that a process or a function (and thus processor 102) may be implemented using other technologies such as analog technologies.

Referring back to FIG. 1, controlling structure 124 comprises one or more controlling circuits, such as graphic controllers, input/output chipsets and the like, for coordinating operations of various hardware components and modules of computing device 102/104.

Memory 126 comprises one or more storage devices or media accessible by processing structure 122 and controlling structure 124 for reading and/or storing instructions for processing structure 122 to execute, and for reading and/or storing data, including input data and data generated by processing structure 122 and controlling structure 124. Memory 126 may be volatile and/or non-volatile, non-removable or removable memory such as RAM, ROM, EEPROM, solid-state memory, hard disks, CD, DVD, flash memory, or the like.

Network interface 128 comprises one or more network modules for connecting to other computing devices or networks through network 108 by using suitable wired or wireless communication technologies such as Ethernet, WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, 5G New Radio (5G NR) and/or other 5G networks, and/or the like. In some embodiments, parallel ports, serial ports, USB connections, optical connections, or the like may also be used for connecting other computing devices or networks although they are usually considered as input/output interfaces for connecting input/output devices.

Input interface 130 comprises one or more input modules for one or more users to input data via, for example, a touch-sensitive screen, a touch-sensitive whiteboard, a touch-pad, a keyboard, a computer mouse, a trackball, a microphone, a scanner, a camera, and/or the like. Input interface 130 may be a physically integrated part of computing device 102/104 (for example, the touch-pad of a laptop computer or the touch-sensitive screen of a tablet), or may be a device physically separate from, but functionally coupled to, other components of computing device 102/104 (for example, a computer mouse). Input interface 130, in some implementations, may be integrated with a display output to form a touch-sensitive screen or touch-sensitive whiteboard.

Output interface 132 comprises one or more output modules for outputting data to a user. Examples of the output modules include displays (such as monitors, LCD displays, LED displays, projectors, and the like), speakers, printers, virtual reality (VR) headsets, augmented reality (AR) goggles, and/or the like. Output interface 132 may be a physically integrated part of computing device 102/104 (for example, the display of a laptop computer or tablet), or may be a device physically separate from but functionally coupled to other components of computing device 102/104 (for example, the monitor of a desktop computer).

System bus 138 interconnects various components 122 to 134, enabling them to transmit and receive data and control signals to and from each other.

Figure 3:
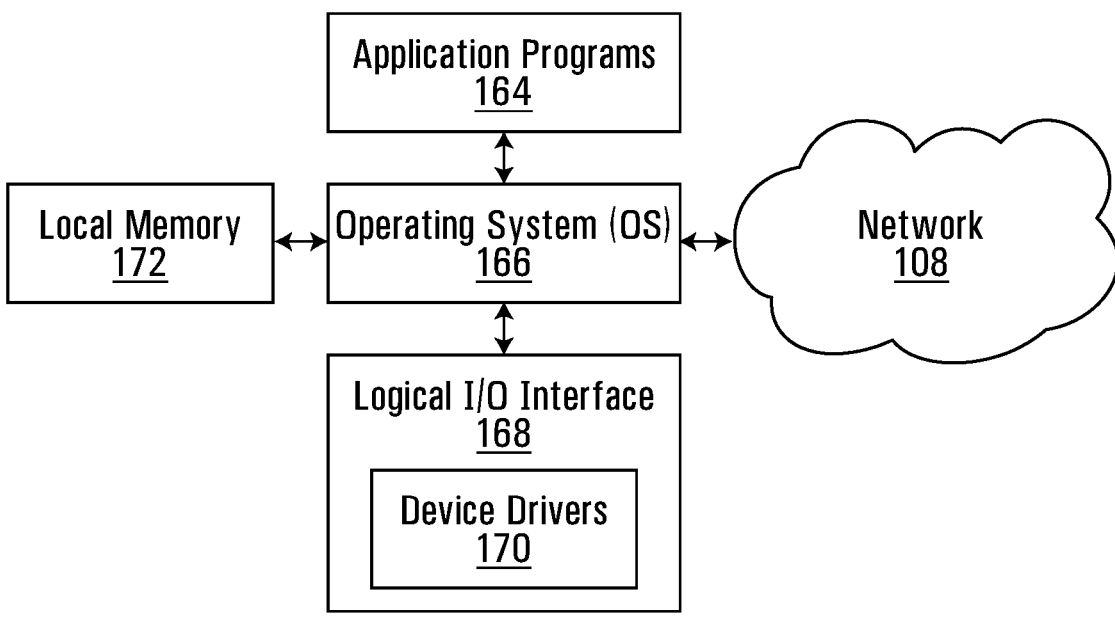
FIG. 3 a schematic diagram of a simplified software architecture of a computing device of the computer network system shown in FIG. 1.

FIG. 3 shows a simplified software architecture 160 of computing device 102 or 104. Software architecture 160 comprises one or more application programs 164 ("application programs 164"), an operating system 166, a logical input/output (I/O) interface 168, and a logical memory 172. Application programs 164, operating system 166, and logical I/O interface 168 are generally implemented as computer-executable instructions or code in the form of software programs or firmware programs stored in logical memory 172 which may be executed by processing structure 122.

Application programs 164 are executed by or run by processing structure 122 for performing various tasks.

Operating system 166 manages various hardware components of computing device 102 or 104 via logical I/O interface 168, manages logical memory 172, and manages and supports application programs 164. Operating system 166 is also in communication with other computing devices (not shown) via network 108 to allow application programs 164 to communicate with those running on other computing devices. As those skilled in the art will appreciate, operating system 166 may be any suitable operating system such as MICROSOFT® WINDOWS® (MICROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDROID is a registered trademark of Google LLC, Mountain View, CA, USA), or the like. Computing devices 102 and 104 of image-sanitization system 100 may all have the same operating system, or may have different operating systems.

Logical I/O interface 168 comprises one or more device drivers 170 for communicating with respective input and output interfaces 130 and 132 for receiving data therefrom and sending data thereto. Received data may be sent to application programs 164 for being processed by application programs 164. Data generated by application programs 164 may be sent to logical I/O interface 168 for outputting to various output devices (via output interface 132).

Logical memory 172 is a logical mapping of physical memory 126 for facilitating access thereto by application programs 164. In this embodiment, logical memory 172 comprises a storage memory area that may be mapped to a non-volatile physical memory such as hard disks, solid-state disks, flash drives, and the like, generally for long-term data storage therein. Logical memory 172 also comprises a working memory area that is generally mapped to high-speed, and in some implementations volatile, physical memory such as RAM, generally for application programs 164 to temporarily store data during program execution. For example, an application program 164 may load data from the storage memory area into the working memory area, and may store data generated during its execution into the working memory area. The application program 164 may also store some data into the storage memory area as required or in response to a user's command.

In a server computer 102, application programs 164 generally provide server functions for managing network communication with client computing devices 104 and facilitating collaboration between server computer 102 and client computing devices 104. Herein, the term "server" may refer to a server computer 102 from a hardware point of view or a logical server from a software point of view, depending on the context.

As described above, processing structure 122 is usually of no use without meaningful firmware and/or software. Similarly, while a computer system such as pose determination system 100 may have the potential to perform various tasks, it cannot perform any tasks and is of no use without meaningful firmware and/or software. As will be described in more detail later, pose determination system 100 described herein and the modules, circuitries, and components thereof, as a combination of hardware and software, generally produce tangible results tied to the physical world, wherein the tangible results such as those described herein may lead to improvements to the computer devices and systems themselves, the modules, circuitries, and components thereof, and/or the like.

Performing Vehicle Pose Determination

As described above, embodiments of the disclosure are directed to predicting the pose of an ego-vehicle with respect to the roadway the vehicle is travelling upon. According to embodiments, vehicle pose determination system 100 comprises four modules:

1. Roadway Marking Detection Module
2. Preprocessing Module
3. Pose Determination Module
4. Postprocessing Module The Preprocessing, Pose Determination, and Postprocessing modules are unique and custom designs. The Roadway Marking Detection Module may also be a custom design but, according to some embodiments, may use an off-the-shelf detector for road lanes and markings.

Markings detected on the roadway may be processed in a similar manner to unordered point-sets which allow neural network to be adapted to directly regress ego-vehicle pose. This approach differs from classical computer vision algorithms that are used to regress pose from lane detections as well as from end-to-end camera pose regression networks that regress pose directly from image pixels using convolutional neural networks. Generally, a set of points may be considered unordered if, from the point of view of the network, any permutation of the points that is input to the network is equivalent to any other permutation of the points that is input to the network.

Figure 4:
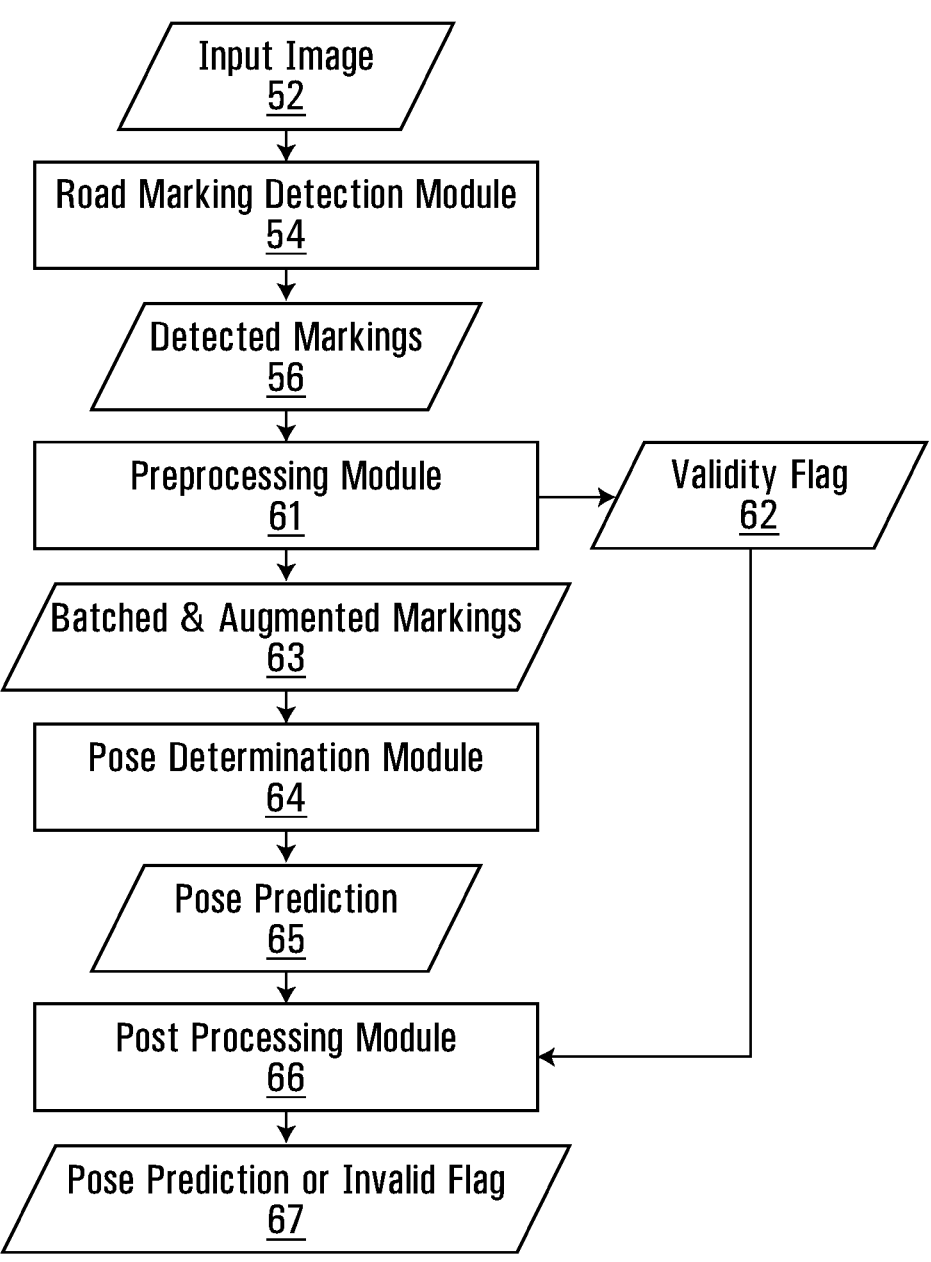
FIG. 4 shows a flow diagram of a method of determining a pose of a vehicle, according to an embodiment of the disclosure.

FIG. 4 shows an example flow diagram of a method of determining a vehicle pose, using the Roadway Marking Detection Module, the Preprocessing Module, the Pose Determination Module, and the Postprocessing Module. As can be seen an input image 52 is first provided to Roadway Marking Detection Module 54 which then outputs detected road markings 56. Road markings 56 are provided to Preprocessing Module 61 which outputs a validity flag 62 (discussed in further detail below) and batched and augmented road markings 56. Batched and augmented road markings 56 are provided to Pose Determination Module 64 which, as described in further detail below, regresses the vehicle pose 65. The estimated vehicle pose 65 is then passed to Postprocessing Module 66 which outputs an updated vehicle pose estimation 67. Road markings may include lane markings as well as non-lane markings.

Figure 5:
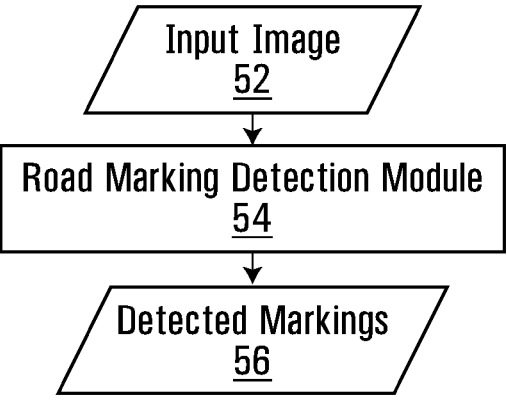
FIG. 5 shows a flow diagram of a method of obtaining a set of unordered points relating to road markings, according to an embodiment of the disclosure.

An example flow diagram of the Roadway Marking Detection Module 54 is shown in FIG. 5. As mentioned above, according to some embodiments, Roadway Marking Detection Module 54 uses an off-the-shelf detector for road lanes and markings. Input to Roadway Marking Detection Module 54 is a camera image 52 and the output is a set of road markings 56 and class indexes indicating the type of marking. The output may be either unstructured (an unordered list of 2D pixel coordinates [ui, vi]) or structured in that pixel coordinates are grouped according to the content of the scene. According to some embodiments, road markings 56 are returned as a list of lane detections, each containing a list of ordered 2D pixel coordinates that form polylines coinciding with the detected lanes in input image

Figure 6:
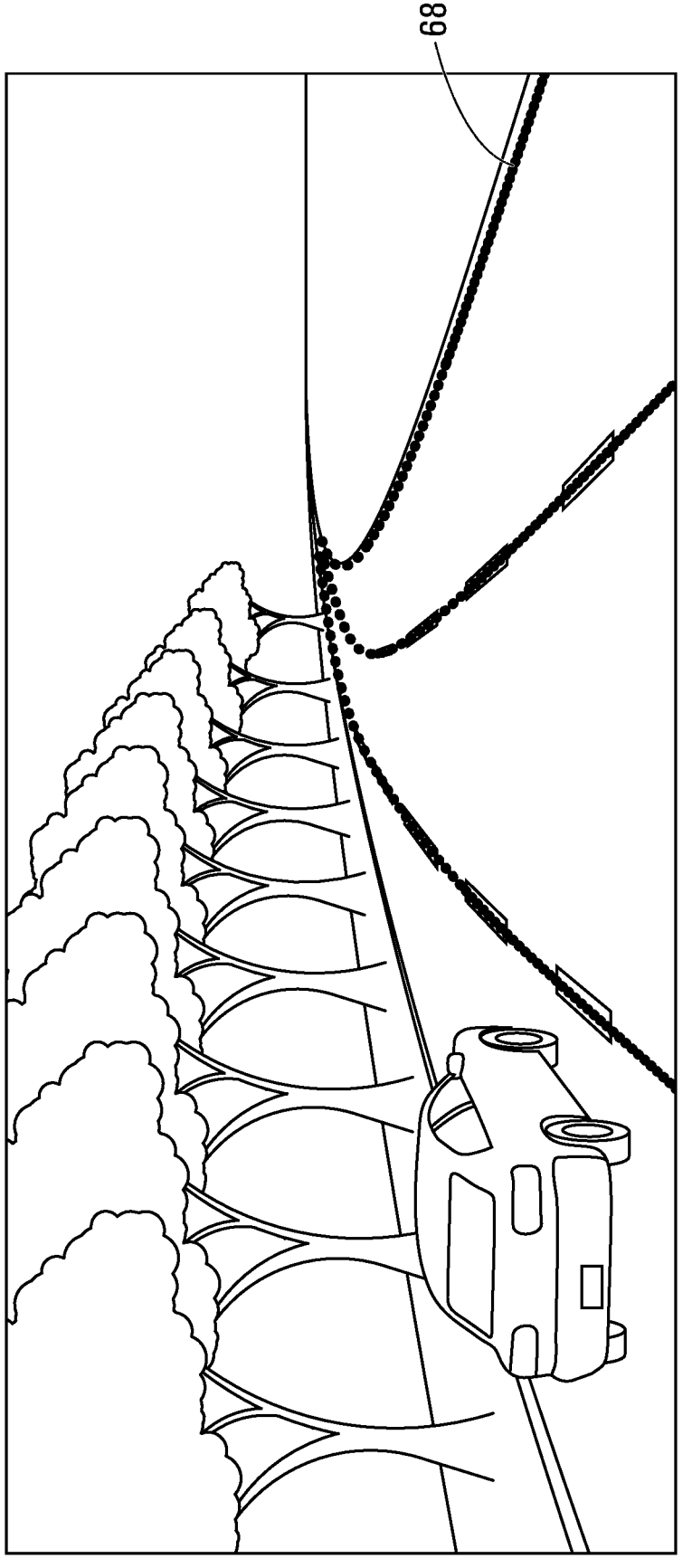
FIG. 6 shows a set of unordered points relating to road markings, obtained from an input image, according to an embodiment of the disclosure.

52. An example of a set of points 68 corresponding to road markings, as output by Roadway Marking Detection Module 54, is shown in FIG. 6.

Figure 7:
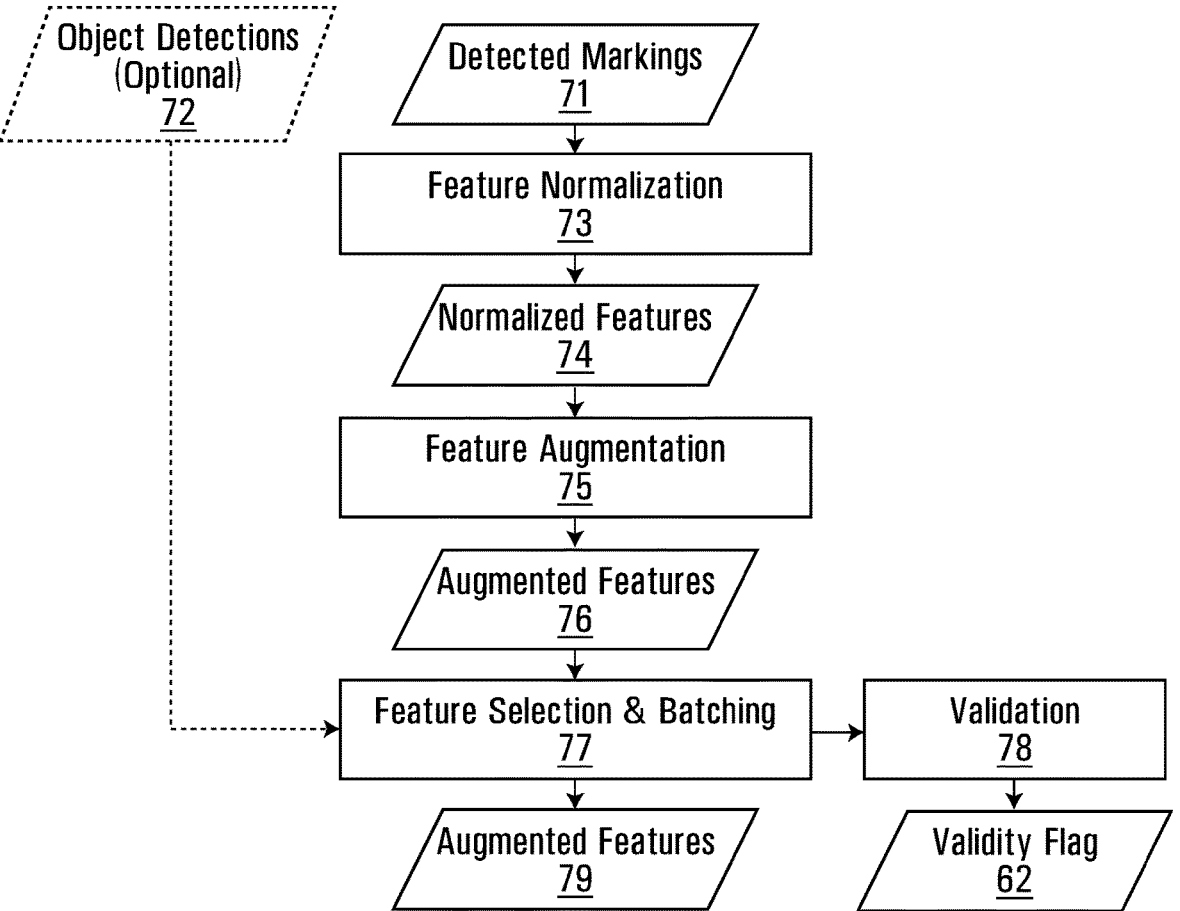
FIG. 7 shows a flow diagram of a method of preprocessing the unordered points obtained using the method in FIG. 5, according to an embodiment of the disclosure.

Turning now to FIG. 7, Preprocessing Module 61 is a module that receives detected road markings 56 output by Roadway Marking Detection Module 54, and performs several processing steps on road markings 56 to prepare the input for computations in later stages of the pipeline. Preprocessing Module 61 may also optionally receive a set of object detections 72 from other components of the ADAS onboard the vehicle. If such other components are present, they may identify regions of input image 52 containing vehicles, pedestrians, cyclists, signs, or other common objects that may occlude the roadway. Object detections 72 may take any suitable form, and for example may include boxes/polygons around each object or even pixel-accurate segmentations distinguishing objects from non-objects.

As shown in FIG. 4, Preprocessing Module 61 performs a validation step wherein Preprocessing Module 61 first verifies that the input is suitable for making a prediction. According to some embodiments, this the input is considered suitable for making a prediction if the input includes points associated with at least two lane lines, with each lane line being associated with at least 8 points. These parameters were found to be the minimum required for adequate prediction accuracy. If the input is found to be unsuitable for making a prediction, a flag may be set indicating as much. The flag may be used to disable subsequent processing, or disregard predictions that are likely to be inaccurate.

Returning to FIG. 7, at block 72, Preprocessing Module 61 performs feature normalization on the input. The feature normalization normalizes features with respect to the field-of-view and resolution of the camera. According to some embodiments, this comprises multiplying the individual point detections in pixels $p_i = [u_i, v_i, 1]$ by the inverse of the 3×3 camera intrinsic matrix K, and discarding the third coordinate to produce a set 74 of normalized detections $q_i = K^{-1} p_i$. This step allows the subsequent Pose Determination Module 64 to be trained using data captured from a camera with a different resolution and field of view than the camera used by the system in operation, or trained on a mix of data captured from different cameras. The feature normalization step may furthermore significantly improve generalization and robustness.

At block 75, Preprocessing Module 61 optionally performs feature augmentation on normalized features 74. For example, Preprocessing Module 61 may perform feature augmentation in the event that Roadway Marking Detection Module 54 provides structured detections. For example, Roadway Marking Detection Module 54 may generate a poly line (a list of points, with each point in the list connected to its adjacent points in the list) for each lane line. The connections provide additional structure to the input beyond each point existing and having a known location. This can be used, for example, to compute the direction of the lane line at each point. One such augmentation is to take differences of connected points and concatenate them to the normalized points. For example, if $q_a$ follows $q_b$ in the structured input detections, then the augmented point would be $[q_{ax}, q_{ay}, q_{ax} - q_{bx}, q_{ay} - q_{by}]^T$. This example is non-limiting, and other augmentations are also possible and may provide higher-level information to Pose Determination Module 64. For example, Pose Determination Module 64 may augment based on a direction associated with a group of the points (as described above), or based on a line fitted to a group of the points.

At block 77, Preprocessing Module 61 performs feature selection and batching on the augmented features 76. First, the augmented $q_i$ points 76 are checked against the set of object detections 72, if available. Any augmented points that occur inside detected objects, such as vehicles or pedestrians, are discarded. Additionally, points whose augmentations make use of neighboring points that are within detected objects are also discarded. Removing these points reduces the risk of erroneous road-marking detections being provided to Pose Determination Module 64. In the event that object detections are available, at block 78 the validity criteria are re-checked to ensure that the input is still valid after having culled points found to be inside detected objects. Validity flag 62 is then outputted from the validation process.

Next, augmented points 76 are collected into a fixed-size batch of N points for Pose Determination Module 64. According to some embodiments, this may comprise performing randomized sampling of augmented points 76 with replacement, but many other selection strategies are possible. For instance, the closest N points or furthest N points from the vehicle may be used. The specific choice of N may depend on the target hardware and the compute budget. The resulting batch of augmented features 79 forms the input to Pose Determination Module 64. According to other embodiments, the number of points may be reduced by randomly sampling at least some of the points, or by filtering out points that are determined to not relate to a road marking.

Figure 8:
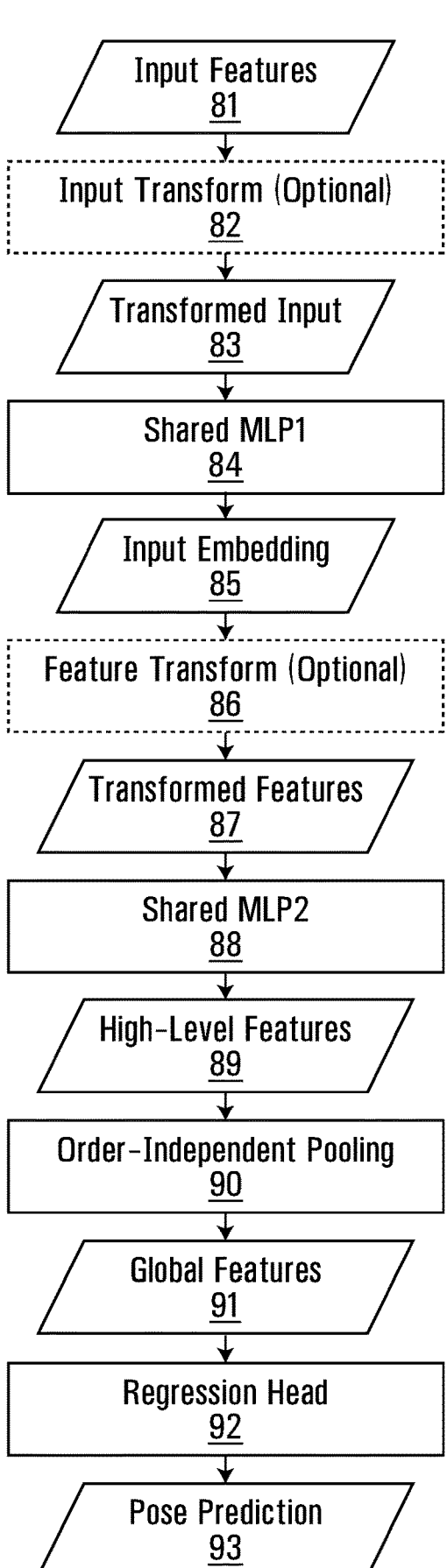
FIG. 8 shows a flow diagram of a method of regressing the pose of the vehicle using the preprocessed points obtained using the method in FIG. 7, according to an embodiment of the disclosure.

Turning to FIG. 8, Pose Determination Module 64 performs the regression of the vehicle pose based on augmented features 79 output from Preprocessing Module 61. Pose Determination Module 64 comprises a neural network with an architecture that is structurally similar to the one described in Qi, Charles R., et al., "*PointNet: Deep learning on point sets for 3d classification and segmentation.*", Proceedings of the IEEE conference on computer vision and pattern recognition, 2017, incorporated herein by reference in its entirety. However, the neural network has been customized to be used for regressing vehicle pose from road markings.

Each unordered point received from Roadway Marking Detection Module 54 and that is normalized and optionally augmented by Preprocessing Module 61 is passed through a series of neural networks independently until the final stage at which a symmetric pooling operation is applied over all points to consolidate their information into a global embedding from which a pose prediction may be made. Assuming each of the N points in the input batch 81 comprises an M-element vector, the sequence of steps performed by Pose Determination Module 64 is as follows.

At block 82, each M-element input point is optionally multiplied by an M×M matrix that is learned during training to further normalize the neural network inputs, thereby generating a set of transformed output points 83.

At block 84, each M-element output point is passed through a small multilayer perceptron (MLP) neural network to produce an R-dimensional feature 85 for the point (R>M). A perceptron (or McCulloch-Pitts neuron) is used for supervised learning of binary classifiers.

At block 86, each point is optionally multiplied by an R×R matrix that is learned during training to normalize the resulting features, thereby generating a set of transformed features 87.

At block 88, each R-element transformed feature 87 is passed through another small multilayer-perceptron neural network to produce a higher order S-dimensional feature 89.

At block 90, the N×S array of features for each input point are then pooled to form a global feature 91 by applying an order-independent reduction operation over all N points for each of the S-dimensional features. According to some embodiments, the maximum over all points of each of the S-dimensional features is used, but other reductions (e.g. using the average, the minimum, etc.) share the order-independence property and could be used instead.

At block 92, the S-dimensional global feature 91 is passed through another MLP which produces a single output logit for each desired prediction, e.g. if pitch and roll are desired, the Pose Determination Module 64 produces two output logits. These logits are related directly to the predictions for the relevant quantities.

At block 93, based on the output logit(s), Pose Determination Module 64 outputs a prediction for the vehicle pose.

Advantageously, Pose Determination Module 64 comprises a generally compact and efficient neural network, and may require as little as 70 KB of weights and may run in excess of several thousand evaluations per second without dedicated deep learning accelerators. Therefore, the incremental cost of applying the method described herein relative to an existing Advanced Driver-Assistance System that must detect road landmarks is negligible, unlike convolutional neural network (CNN)-based approaches that incur extra computationally intensive network evaluations.

Pose Determination Module 64 is trained using the output of existing road-landmark detectors and so learns how systematic errors made by such road-landmark detectors can map to the target vehicle pose. In contrast, methods based on classical computer vision techniques typically assume "clean" inputs and exhibit robustness issues when their inputs contain significant errors.

Pose Determination Module 64 automatically learns to adapt to inputs for which classical computer vision does not have straightforward analytic or numerical solutions. This includes inputs such as curving lanes, non-planar road surfaces, and non-parallel road markings.

Pose Determination Module 64 does not have a sensitivity to image content since it operates based on road marking detections rather than images. This leads to improved robustness and generalizability relative to CNN approaches since road markings exhibit far more regularity than arbitrary images of street scenes. This also means that Pose Determination Module 64 does not introduce an additional point-of-failure on the perceptron side.

Compared to the architecture described in "*PointNet: Deep learning on point sets for 3d classification and segmentation.*", the size of Pose Determination Module 64 relatively smaller, and it was found that setting R & S to $\frac{1}{8}^{th}$ of their values in *PointNet* achieves a good balance between network size, speed, and accuracy. This may significantly speed up the network and reduce overfitting.

According to some embodiments, the input transform step (block 82) and the feature transform step (block 86) may be removed. It was found that including these steps did not improve performance unless both were present and, when both were present, the accuracy was comparable to a scaled-up network version that excludes the two transforms but which is still smaller.

Furthermore, the dimensionality of the points were generalized to more than three dimensions, allowing arbitrary dimensions for input points to match the corresponding augmentations performed by Preprocessing Module 61.

Figure 9:
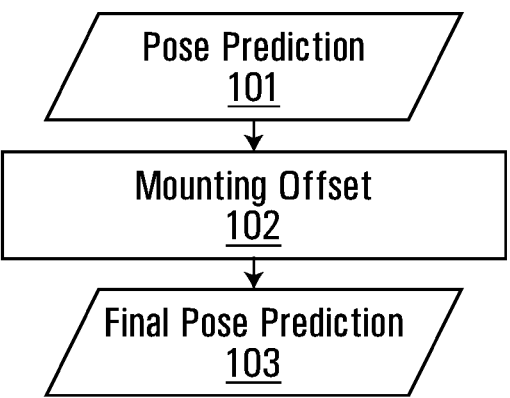
FIG. 9 shows a flow diagram of a method of post-processing the output of the method shown in FIG. 8, according to an embodiment of the disclosure.

Turning to FIG. 9, Postprocessing Module 66 serves to adapt vehicle pose determination system 100 to different cameras that are installed with different orientations with respect to the roadway. Postprocessing Module 66 receives as its input the predicted vehicle pose 101 output by Pose Determination Module 64 and validity flag 62 from Preprocessing Module 61. If validity flag 62 indicates that the flag is valid, Postprocessing Module 66 applies a pre-calibrated rigid rotation 102 to predicted vehicle pose 101 to reconcile it with the actual installed orientation of the camera. The output from Postprocessing Module 66 is the final estimation of the vehicle pose 103. If validity flag 62 indicates that the flag is invalid, the output from Pose Determination Module 64 is discarded and only the invalid flag is output.

Vehicle pose estimates using embodiments of vehicle pose determination system 100 described herein were compared to ground truth vehicle pose, and the results are shown in FIG. 11.

Embodiments of vehicle pose determination system 100 described herein have been tested against other CNN/classical vision solutions and was found to be more accurate. Increased accuracy in the pose estimation enables longer planning horizons for subsequent systems.

Furthermore, by reusing existing lane detections as inputs to a small regression network (Pose Determination Module 64), embodiments described herein may add only a near-negligible overhead relative to other methods that must either execute another CNN or break out of the neural net processing pipeline to perform complex computer vision algorithms. The architecture of Pose Determination Module 64 is relatively small and can be easily incorporated into existing systems with constrained resources.

Further still, by operating with existing lane detections, embodiments of the disclosure can both adapt to systematic errors of Roadway Marking Detection Module 54 while lowering the risk of additional points-of-failure. As a small network, avoiding overtraining may be significantly easier relative to CNNs, and the regularity of road markings relative to typical street-scene images additionally improves generalization to unseen examples.

The pipelines/flow diagrams described herein readily extend to allow additional information to be incorporated, e.g. different augmentations, additional marking classes, and different Inertial Measurement Unit (IMU) estimates.

Figure 10A:
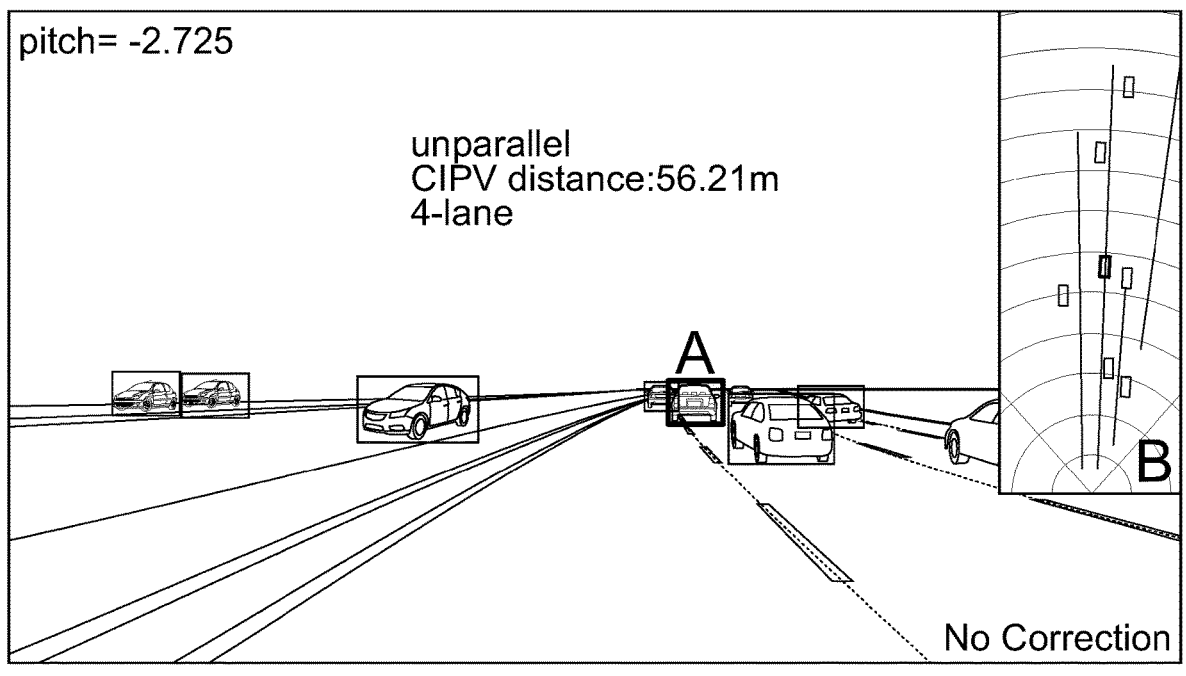
FIG. 10A shows an example of the output of a Closest In-Path Vehicle (CIPV) system without correction for vehicle pose.
Figure 10B:
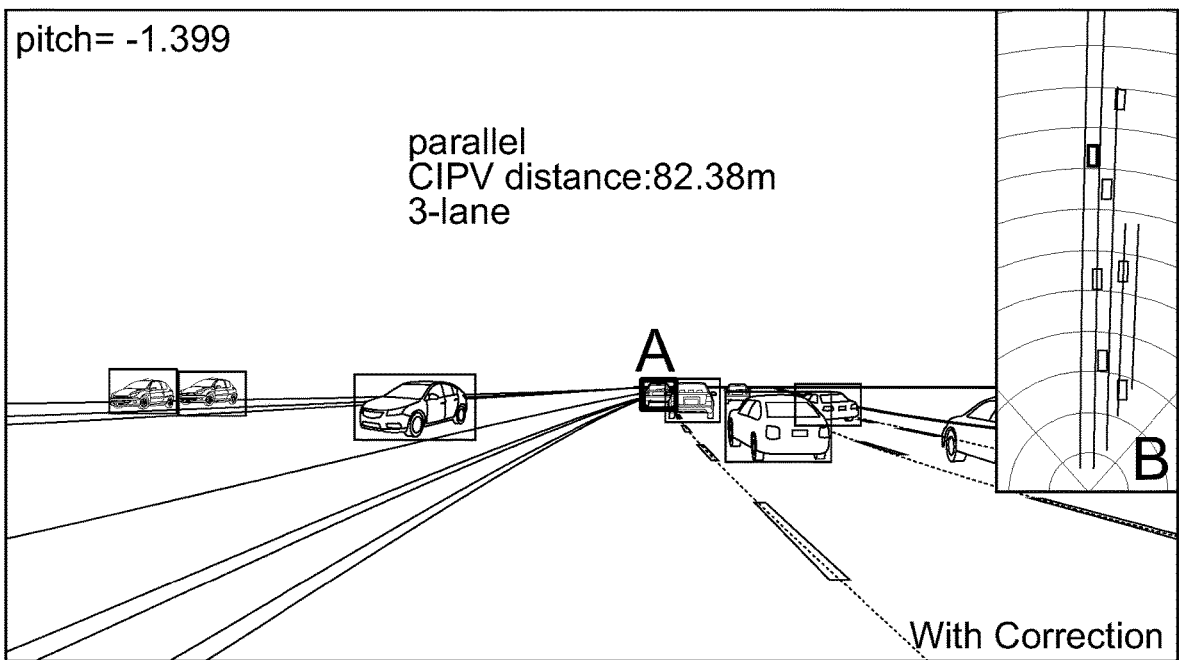
FIG. 10B shows an example of the output of the Closest In-Path Vehicle (CIPV) system with correction for vehicle pose, according to an embodiment of the disclosure.

Embodiments of the disclosure may be used to improve FCW systems by incorporating camera-pose information to correct CIPV calculations and improve Time-To-Collision (TTC) estimates. For example, as can be seen in FIG. 10A, the CIPV is incorrectly identified. However, by implementing one or more embodiments of vehicle pose determination system 100 as described herein, the CIPV is correctly identified, as can be seen in FIG. 10B.

According to some embodiments, and as would be recognized by the skilled person, various operations shown in the flow diagrams may be omitted without departing from the scope of the disclosure. For example, according to some embodiments, preprocessing the input to Pose Determination Module 64, and post-processing the output of Pose Determination Module 64, may not be required. Instead, the disclosure may more generally relate to receiving a set of unordered points associated with road markings, inputting the unordered points to a trained artificial neural network, using the artificial neural network to generate an output by applying non-linear regression to the unordered points, and determining, based on the output, the pose of the vehicle, The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terms "a" or "an" when used in conjunction with the terms "comprising" or "including" in the claims and/or the specification can mean "one" but it is also consistent with the meaning of "one or more", "at least one", and "one or more than one" unless the content clearly dictates otherwise. Similarly, the word "another" may mean at least a second or more, unless the content clearly dictates otherwise.

The terms "coupled", "coupled", or "connected" as used herein, may have a number of different meanings depending on the context in which the terms are used. For example, the terms coupled, or connected may have a mechanical or electrical meaning. For example, as used herein, the terms coupled, or connected may indicate that two elements or devices are connected to each other directly or via one or more intermediate elements or devices via electrical, or mechanical elements, depending on the particular context. The term "and/or" as used herein when used in association with a list of items refers to any one or more of the items comprising the list.

As used herein, reference to "about" or "approximately" a number or "substantially" is equal to a number means within +/−10% of the number.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A method of determining a pose of a vehicle, comprising:

receiving a set of unordered points associated with road markings;

inputting the unordered points to a trained artificial neural network, wherein, from the point of view of the network, any permutation of the points that is input to the network is equivalent to any other permutation of the points that is input to the network;

using the artificial neural network to generate an output by applying non-linear regression to the unordered points;

determining, based on the output, the pose of the vehicle;

providing the determined pose to a collision warning system configured to identify, in one or more images, one or more objects and their respective one or more positions relative to the vehicle; and using the collision warning system to adjust, based on the determined pose, the position of at least one identified object.

2. The method of claim 1, wherein receiving the set of unordered points comprises:

receiving the set of unordered points from a lane detection computer module configured to identify, within one or more images of the road markings, the unordered points.

3. The method of claim 2, wherein the lane detection computer module is configured to identify the unordered points using one or more convolutional neural networks.

4. The method of claim 1, further comprising, before inputting the unordered points to the artificial neural network:

determining that the set of unordered points is valid.

5. The method of claim 4, wherein determining that the set of unordered points is valid comprises determining that one or more of:

the unordered points are associated with at least two sets of lane markings, each set of lane markings comprising one or more aligned lane markings; and at least a preset number of the unordered points are associated with a given set of lane markings, each set of lane markings comprising one or more aligned lane markings.

6. The method of claim 1, further comprising, before inputting the unordered points to the artificial neural network:

normalizing the set of unordered points based on a camera intrinsic matrix associated with a camera onboard the vehicle.

7. The method of claim 1, further comprising, before inputting the unordered points to the artificial neural network:

augmenting the set of unordered points by increasing a dimensionality of each unordered point by at least one.

8. The method of claim 7, wherein augmenting the set of unordered points comprises associating one or more of the following with each unordered point:

a direction associated with the unordered point and at least one other unordered point;

a group comprising the unordered point and at least one other unordered point; and a line fitted to the unordered point and at least one other unordered point.

9. The method of claim 1, further comprising, before inputting the unordered points to the artificial neural network, one or more of:

increasing the number of unordered points by randomly sampling with replacement at least some of the unordered points;

in response to determining that the number of unordered points is above a threshold, reducing the number of unordered points by randomly sampling at least some of the unordered points;

in response to determining that the number of unordered points is above a threshold, reducing the number of unordered points by filtering out one or more unordered points that are neither within a minimum preset distance nor a maximum preset distance from the vehicle; and for each unordered point, filtering out of the unordered point if it is determined to not relate to a road marking.

10. The method of claim 1, wherein generating the output by applying non-linear regression to the set of unordered points comprises:

passing each unordered point through a first multi-layer perceptron neural network to generate an updated unordered point comprising an R-dimensional feature;

passing each updated unordered point through a second multi-layer perceptron neural network to generate an S-dimensional feature, wherein S>R;

generating an S-dimensional global feature by applying an order-independent reduction operation to each S-dimensional feature; and generating the output by passing the S-dimensional global feature through a third multi-layer perceptron neural network.

11. The method of claim 1, wherein determining the pose of the vehicle comprises:

adjusting the output based on an orientation of a camera onboard the vehicle; and determining the pose based on the adjusted output.

12. The method of claim 1, wherein the pose of the vehicle comprises a pitch of the vehicle.

13. A vehicle comprising:

a vehicle pose module comprising one or more processors communicative with one or more computer-readable media and configured to:

receive a set of unordered points associated with road markings;

input the unordered points to a trained artificial neural network, wherein, from the point of view of the network, any permutation of the points that is input to the network is equivalent to any other permutation of the points that is input to the network;

use the artificial neural network to generate an output by applying non-linear regression to the unordered points; and determine, based on the output, a pose of the vehicle.

14. The vehicle of claim 13, wherein the one or more processors are further configured to:

receive the set of unordered points from a lane detection computer module configured to identify, within one or more images of the road markings, the unordered points.

15. The vehicle of claim 13, wherein the one or more processors are further configured to, before inputting the unordered points to the artificial neural network:

normalize the set of unordered points based on a camera intrinsic matrix associated with a camera onboard the vehicle.

16. The vehicle of claim 13, wherein the one or more processors are further configured to, before inputting the unordered points to the artificial neural network:

augment the set of unordered points by increasing a dimensionality of each unordered point by at least one.

17. The vehicle of claim 13, wherein the one or more processors are further configured to, before inputting the unordered points to the artificial neural network, one or more of:

increase the number of unordered points by randomly sampling with replacement at least some of the unordered points;

in response to determining that the number of unordered points is above a threshold, reduce the number of unordered points by randomly sampling at least some of the unordered points;

in response to determining that the number of unordered points is above a threshold, reduce the number of unordered points by filtering out one or more unordered points that are neither within a minimum preset distance nor a maximum preset distance from the vehicle; and for each unordered point, filter out of the unordered point if it is determined to not relate to a road marking.

18. The vehicle of claim 13, wherein the one or more processors are further configured to:

provide the determined pose to a collision warning system configured to identify, in one or more images, one or more objects and their respective one or more positions relative to the vehicle; and use the collision warning system to adjust, based on the determined pose, the position of at least one identified object.

19. A non-transitory computer-readable medium comprising computer program code configured, when executed by one or more processors, to cause the one or more processors to perform a method comprising:

receiving a set of unordered points associated with road markings;

inputting the unordered points to a trained artificial neural network, wherein, from the point of view of the network, any permutation of the points that is input to the network is equivalent to any other permutation of the points that is input to the network;

using the artificial neural network to generate an output by applying non-linear regression to the unordered points; and determining, based on the output, a pose of the vehicle.

* * * * *